United States Patent
Pesce et al.

(10) Patent No.: US 10,527,056 B2
(45) Date of Patent: Jan. 7, 2020

(54) METHOD FOR REPAIRING A GENERATOR ROTOR BLADE CONNECTION

(71) Applicant: General Electric Technology GmbH, Baden (CH)

(72) Inventors: Michele Pesce, Zurich (CH); Juergen Gerhard Hoffmann, Baden (CH)

(73) Assignee: General Electric Company, Schenectady, NY (US)

(*) Notice: Subject to any disclaimer, the term of this patent is extended or adjusted under 35 U.S.C. 154(b) by 483 days.

(21) Appl. No.: 15/369,074

(22) Filed: Dec. 5, 2016

(65) Prior Publication Data
US 2017/0167506 A1    Jun. 15, 2017

(30) Foreign Application Priority Data
Dec. 9, 2015 (EP) .................................... 15198596

(51) Int. Cl.
| | | |
|---|---|---|
| *F04D 29/34* | (2006.01) | |
| *F04D 29/38* | (2006.01) | |
| *F04D 29/32* | (2006.01) | |
| *H02K 9/06* | (2006.01) | |
| *F01D 5/00* | (2006.01) | |
| *F01D 5/30* | (2006.01) | |

(Continued)

(52) U.S. Cl.
CPC .............. *F04D 29/34* (2013.01); *B23P 6/005* (2013.01); *F01D 5/005* (2013.01); *F01D 5/3023* (2013.01); *F04D 29/322* (2013.01); *F04D 29/38* (2013.01); *H02K 9/06* (2013.01); *F01D 15/10* (2013.01); *F05D 2220/32* (2013.01); *F05D 2230/80* (2013.01)

(58) Field of Classification Search
CPC ........ F04D 29/36; F04D 29/362; F04D 29/38; F04D 29/388; F04D 29/322; F04D 29/324; F04D 29/34
USPC ..................................................... 416/219 R
See application file for complete search history.

(56) References Cited

U.S. PATENT DOCUMENTS

| 2,407,904 A | 9/1946 | Rosan |
| 3,073,569 A * | 1/1963 | Wagner ................. F01D 5/3023 416/193 A |

(Continued)

FOREIGN PATENT DOCUMENTS

| EP | 1 026 814 A2 | 8/2000 |
| EP | 1 877 218 B1 | 9/2009 |

OTHER PUBLICATIONS

Extended European Search Report and Opinion issued in connection with corresponding EP Application No. 15198596.7 dated May 31, 2016.

*Primary Examiner* — Dwayne J White
*Assistant Examiner* — Jason Mikus
(74) *Attorney, Agent, or Firm* — Theodoros Stamatiadis; Hoffman Warnick LLC

(57) ABSTRACT

A method for repairing a blade connection of a generator rotor is disclosed. The generator rotor includes an internally threaded hole formed in the generator rotor and an externally threaded blade root. The method includes the steps of removing the blade from the generator rotor, removing material of a first section of the root extending from an end of the root closest to the airfoil, and screwing the blade back into the threaded hole. Additionally, a reworked blade and a reworked blade generator rotor connection is disclosed.

12 Claims, 1 Drawing Sheet

(51) Int. Cl.
*B23P 6/00* (2006.01)
*F01D 15/10* (2006.01)

(56) References Cited

U.S. PATENT DOCUMENTS 5,374,145 A * 12/1994 Mairesse ............... F01D 5/3023
29/525.11
2006/0251521 A1 * 11/2006 Hernandez .............. B23P 6/005
416/219 R

* cited by examiner

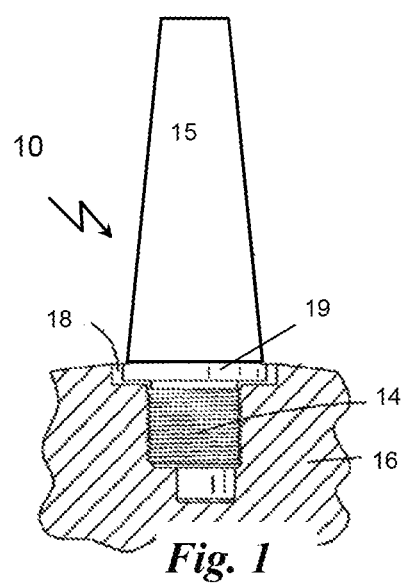
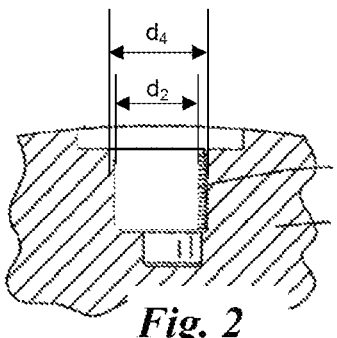
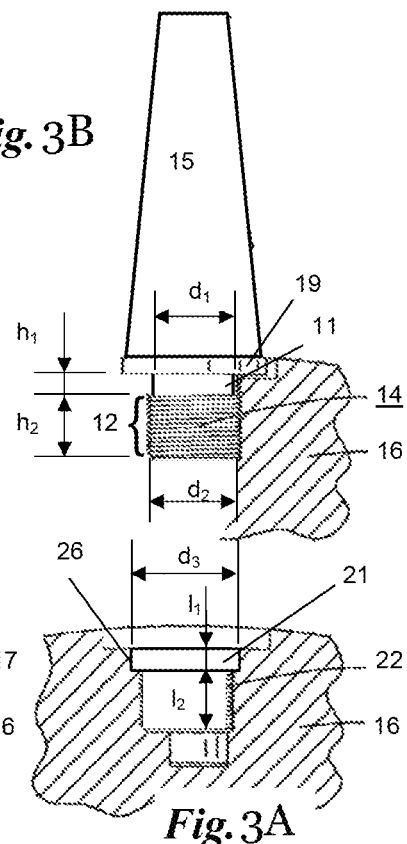
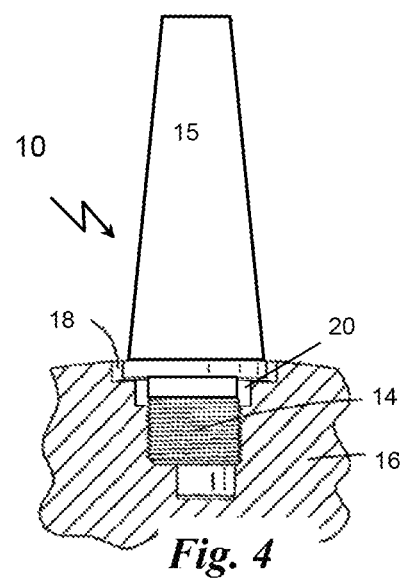
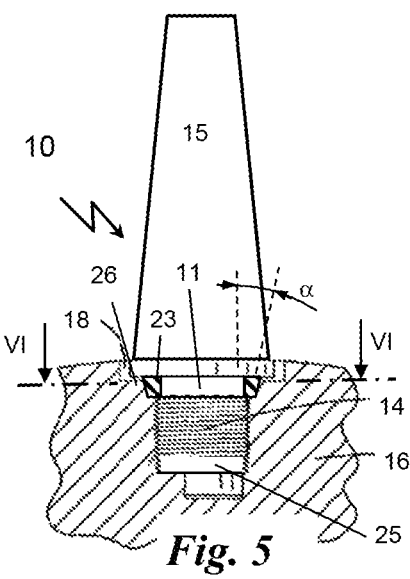
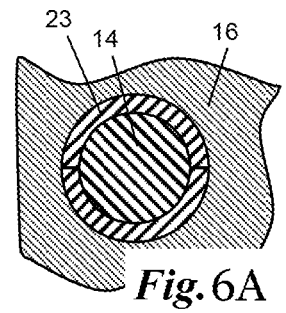
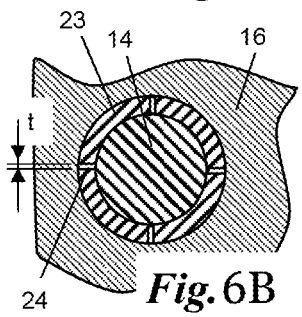

METHOD FOR REPAIRING A GENERATOR ROTOR BLADE CONNECTION

TECHNICAL FIELD

Embodiments of the present invention refer to a method for reworking a damaged rotor blade connection of a threaded blade of a generator. Embodiments of the present invention additionally refer to a reworked blade and reworked blade generator rotor assembly.

BACKGROUND

Single or multiple stage blower fans attached to the rotor of a generator are used for feeding a cooling medium in electrical generators. Blower blades are connected to the rotor of electrical generators in a variety of ways. Threaded connections between the rotor and blade root are known in the art. Threaded connections are simple and easy to assemble. However, the stress levels and cyclic loads can lead to damages in the threaded connection. In particular the first threads on the root of the blade are subject to high cyclic load changes which can cause failure due to fatigue.

A repair method is known in the art which re-establishes a fatigue limit within an assembly having an aluminum component that has become cracked or contains fatigued material. Such an assembly may include an aluminum blade having an aluminum blade root and is connected to a steel blower hub. For repairing the forming of threads on a first diameter of the blade root; which is smaller than the original diameter of the blade root is proposed. To reassemble the blades a securing collar is secured in the hole formed in the blower hub. The collar comprises internal threads for receiving the threads formed on the first diameter of the blade root; and the blade root of the rotor blade is screwed into the collar.

The re-machined blade root has a smaller diameter than the original blade root and thus the strength of the root is reduced. Even if damaged material might have been removed, the re-established fatigue limit time is typically below the life time of an original new part because of the reduced root diameter. In addition an exact alignment of the recut thread on the blade root with the blade axis is difficult and time consuming. In particular during an outage on site this can pose serious practical problems and potentially leads to misaligned or damaged blades.

BRIEF DESCRIPTION

One object of the present disclosure is a reliable simple method for repairing a connection between a generator rotor and a blade. Such a connection comprises an internally threaded hole formed in a generator rotor and an externally threaded blade root. The generator rotor blade itself comprises the externally threaded root and an airfoil.

The assembly can include an aluminum blade having an aluminum blade root which is connected to a steel generator rotor. The blade and rotor can also be made of other materials, e.g. the blades can also be made of steel.

The disclosed method is based on the realization that the load on first threads of a threaded connection is highest, and that the load is decreasing rapidly towards the far end of the threaded root in a generator rotor blade connection. Due to this load distribution fatigue life is used and cracking starts at the first thread or first couple of threads while the cyclic load on the remaining threads is practically negligible.

The method comprises the steps of removing the blade from the generator rotor, and removing material of a first section of the root wherein the first section is extending from the end of the root which is closest to the airfoil. When removing the material, a second section of the root having threads is retained on the far end of the root relative to the airfoil. The method further comprises the steps of engaging the threads of the second section of the root furthest away from the airfoil into the threaded hole, and of screwing the blade into the threaded hole.

According to a further embodiment the threads of the threaded root remain unchanged in the second section. They do not need to be re-threaded. The thread does not need to be reworked or re-cut but the remaining thread can be used as original thread without any machining as their life time has been practically not been reduced. This allows easy reworking of the blade and fast repairing of the connection.

For example, in a thread connection with five engaged threads the ratio of load carried by the first thread to the load carried by the fifth thread can be in the order of 1.5 to 2. A reduction of the cyclic stress level by 30% to 50% typically increases the number of cycles to failure by at least one to two orders of magnitude. In another example with a thread connection with 8 engaged threads the ratio of load carried by the first thread to the load carried by the fifth thread can be in the order of 3 to 8. The load ratios depend on the material composition and specific geometries. Typically, the remaining life of the last couple of threads is practically equal to the life of a new thread for a thread connection with five or more threads when the first threads fatigue life is used up and cracking becomes visible.

According to an embodiment of the method, material is removed from the root over a height of the first section wherein the height of the first section is larger than two times the pitch of the threads.

According to yet a further embodiment, no material is removed from the root in a second section having a height of at least three times the pitch of the threads. According to one further embodiment at least five threads remain in the second section, e.g. no material is removed from at least five threads.

Typically crack initiation first starts in the blade root. However, the material in the rotor can have experienced substantial aging or can show first signs of crack initiation. To assure full life time of the rotor material is removed in a first hole sector of the threaded holes wherein this first sector is the sector closest to the surface of the generator rotor. In the installed state the first section of the root faces the first hole sector, i.e. both the hole and the root are free of threads in a region close to the outer surface of the rotor.

According to an embodiment of the method the wall of the first hole sector is machined with an inclination such that the diameter decreases towards the bottom of the threaded hole. Thus, the obtained first hole sector has a truncated conical shape.

According to a further embodiment of the method a ring which is split into at least two sections is placed around the first section of the root before the blade is screwed back into the threaded hole. The blade is then screwed into the rotor together with the ring.

According to a further embodiment the ring is pressed between the blade and the generator rotor by screwing the blade into threaded hole.

The ring in combination with the first section of the root and first hole sector can for example be configured as a form fit assembly, i.e. the outer diameter of the ring is form fit with the first hole sector's inner diameter, and the inner diameter of the ring is form fit with the outer diameter of the first section of the root. In the installed state the ring suppresses vibrations of the blade and in particular the propagation of vibrations from the airfoil to the second section of the root and thereby reduces the fatigue wear of the thread.

For a configuration with inclined first hole sector the outer wall of the ring can be shaped with a matching inclination, e.g. inclined with the same angle. According to a further embodiment of the method the ring is pressed in the direction parallel to the axis of the threaded hole by a platform of the blade and against an inclined side wall of the first hole sector when the blade is screwed back into the rotor. The inclined side wall translates the axial movement of the ring sectors into a movement towards the first section of the root thereby creating a form and force fit between the first hole sector in generator rotor, the ring, and the blade root.

When screwing the blade back into the rotor the ring is pressed against the inclined wall. This results in a pressure normal to the axis of the blade effectively locking the blade in the first hole section.

According to another embodiment of the method, material is removed from the generator rotor at the bottom of the threaded hole before the blade is screwed back into the threaded hole. By removing material at the bottom of the threaded hole a free end is provided below the root. Thus, when screwing back the blade into the threaded hole the root of blade does not rest on the bottom of the threaded hole but the blade comes to a rest on the outer surface of the generator rotor, a countersink machined on the outer surface of the generator rotor or on the ring.

To have a good mechanical fit between the blade and the rotor a plane seat can be machined in the surface of the rotor and the blade can comprise a platform arranged between the airfoil and the root. The platform can have a plane lower surface which comes to rest on the seat when installing the blade.

Besides the method, a reworked blade and a reworked blade generator rotor assembly are part of the disclosure.

A reworked blade comprises an airfoil and a root. After reworking the blade has a root which comprises a first section which is extending from an end of the root closest to the airfoil and has a diameter which is smaller than the minor diameter of the thread in a second section of the root wherein the second section of the root is furthest away from the airfoil and has an outer thread.

According to a further embodiment the reworked blade obtained by removing the thread from the root in the first section for a height of first section below the airfoil. The thread can for example be grinded away or the first section of the root can be lathed to the new diameter of the first section.

A reworked blade generator rotor assembly comprises a blade with an airfoil and a threaded root as well as a generator rotor with a threaded hole into which the blade is screwed in. After reworking the root comprises a first section which is extending from an end of the root closest to the airfoil towards the bottom of the hole and which has a diameter which is smaller than the minor diameter of the thread. The root further has a threaded second section which is further away from the airfoil than the first section. Because the first section of the root has a diameter which is smaller than the minor diameter of the thread no threads of the root engage into threads of the threaded hole in an outer section of the threaded hole. The outer section extends for a height of at least two times the pitch of the threads from the surface of the rotor towards the bottom of the threaded hole.

The first section of the reworked root can for example be cylindrical.

According to a further embodiment the reworked blade generator rotor assembly the threaded hole has a first hole sector close to the surface of the generator rotor with a cylindrical shape or conical shape. The smallest diameter of the first sector is larger than the major diameter of thread.

According to yet a further embodiment the reworked blade generator rotor assembly comprises a ring which is split into at least two sections. This ring is placed in a space between the first section of the root and the first hole sector.

The ring can for example have an outer diameter which is equal or fits to the diameter of the first hole sector, and an inner diameter which is equal or fits to the diameter of the first section of the root. Thus a form fit between the root, ring and hole can be established.

According to yet another embodiment the reworked blade-generator rotor assembly the ring is made of soft metal. A ring made of soft metal can be pressed into the space between the first hole sector and the first section of the root. Such a pressed ring can support the blade and dampen vibrations thereby reducing the cyclic load on the thread.

Alternatively or in combination the material of the ring can be selected such that it has higher coefficient of thermal expansion than the material of the root. When the ring is inserted in a form fit arrangement during cold conditions a slight force fit can be achieved during operation do to an increase in temperature.

BRIEF DESCRIPTION OF THE DRAWINGS

The disclosure, its nature as well as its advantages, shall be described in more detail below with the aid of the accompanying schematic drawings. Referring to the drawings:

FIG. 1 shows a partial view of a generator rotor with attached blade.

FIG. 2 shows a partial view of a threaded hole in a generator rotor configured to receive a blade.

FIG. 3A shows a partial view of a reworked threaded hole in a generator rotor configured to receive a blade.

FIG. 3B shows a partial view of a generator rotor with attached reworked blade.

FIG. 4 shows a partial view of a reworked generator rotor with attached reworked blade.

FIG. 5 shows a partial view of a reworked generator rotor with attached reworked blade and a ring for supporting the blade.

FIG. 6A shows the cross section VI-VI with a split ring.

FIG. 6B shows the cross section VI-VI with a split ring consisting of 4 parts.

DETAILED DESCRIPTION

Embodiments of the invention may be beneficial in that they reestablish life time in a threaded blade generator rotor connection.

FIG. 1 shows a partial view of a generator rotor 16 with an attached blade 10. The shown generator utilizes single-stage blowers comprising a row of blades 10. Embodiments of the invention may be used with multi-stage blowers. The blade has an externally threaded root 14 configured to mate with an internally threaded hole 17 formed within rotor 16. In the example of FIG. 1 the blade has a platform 19 arranged between the root 14 and the airfoil 15. The platform is arranged in a countersink 18 plane with the outer surface of the rotor 16. A plurality of blades 10 may be circumferentially disposed around rotor 16 to form a row of blades FIG. 2 shows a partial view of a threaded hole 17 in the generator rotor 16 with the blade removed. The threaded hole 17 as a thread with a minor diameter $d_2$ and a major diameter $d_4$.

FIG. 3A is based on FIG. 2. The threaded hole 17 in the generator rotor 16 is reworked and now comprises a cylindrical first hole sector 21. It is delimited by a wall of the first sector hole wall 26 and has a diameter of first hole sector $d_3$ which is larger than the major thread diameter $d_4$. The first hole sector 21 extends from the surface of the rotor towards the bottom of the threaded root hole 17 and has a length of first sector $l_1$. This length of the first sector $l_1$ can for example be larger than two times the pitch of the thread. In the example shown it is larger than three times the pitch of the thread.

A second hole sector 22 remains with the original thread and has a length of second sector $l_2$. The length of second sector l2 should be long enough to carry the load of a blade 15. Typically it is longer than 3 times the pitch of the thread, in this example it is longer that eight times the pitch of the thread.

FIG. 3B is based on FIG. 1. The blade 10 is replaced by reworked blade 10 and the rotor 16 is further cut away to better indicate the dimension of the root 14. The root 14 is reworked and now comprises a cylindrical first section 11 with a diameter of first section $d_1$ which is smaller than the minor thread diameter $d_2$. The first section 11 extends from the platform 19 of the blade towards the bottom of the root 14 and has a height of first section $h_1$. This length of the first section $h_1$ can for example be larger than two times the pitch of the thread. In the example shown it is larger than three times the pitch of the thread.

FIG. 4 shows a partial view of a reworked generator rotor 16 with an attached reworked blade 10. It is based on the reworked rotor of FIG. 3A and combined with the reworked blade of FIG. 3B. Between the cylindrical first section 11 of the root 14 and the cylindrical first hole sector 21 a gap 20 remains open. The treads of the root 14 engage with the threads of the threaded hole below the gap 20.

FIG. 5 shows a further embodiment and is based on FIG. 4. In this embodiment the first sector hole wall 26 is inclined with an angle α and opens towards the outer surface rotor, respectively to the countersink 18. Thus the first hole sector has a truncated conical shape. A split ring 23 (split is not shown in this Figure) is inserted between the root 14 and threaded hole. In this example the outer wall of the ring is inclined with the same angle α as the first sector hole wall 26. When screwing the blade 15 into the generator rotor the ring 23 is pressed against the inclined first sector hole wall 26. Due to the inclination the ring is then also pressed against the cylindrical outside of the first section 11 of the root 14 thereby forming a force fit which support the blade 10 and suppresses vibrations. Also rings with cylindrical inner and outer walls are conceivable which would fit into a gap 20 as shown in FIG. 4.

When reworking the threaded hole can be elongated to provide a free end 25 below the root to assure that the blade 10 comes to a rest on the ring 23 and presses the ring onto the inclined first sector hole wall 26.

FIG. 6A shows the cross section VI-VI of FIG. 5 with a first example for a ring 23. Here, the ring 23 is split into 2 parts. The two parts can be placed around the first section of the root before reassembly of the blade into the rotor.

FIG. 6B shows the cross section VI-VI with a split ring which consists of four parts. The four parts can be obtained by cutting a ring. In a circular arrangement as shown around the root 14 the four parts are separated by a slit 24. The slit 24 has a thickness of slit t which allows the four parts to be pressed onto the root when installing the blade into the root. The slit prevents the parts to rest on the abutting faces of the ring 23. The slit t can for example be in the range of 0.1% to 5% of the diameter of first section $d_1$ of the root 14.

Electrical generators used in gas turbines may be subjected to different operating conditions and blades 10 may have different designs and operating characteristics. Therefore the blades 10 are subjected to varying loads and stresses. The threaded roots 14 used for attaching a blade 10 to a rotor 16 may vary from generator-to generator, and even from blade-to-blade in a single generator.

It is to be understood that even though numerous characteristics and advantages of various embodiments have been set forth in the foregoing description, together with details of the structure and functions of various embodiments, this disclosure is illustrative only, and changes may be made in detail, especially in matters of structure and arrangement of parts within the principles of the embodiments to the full extent indicated by the broad general meaning of the terms in which the appended claims are expressed. It will be appreciated by those skilled in the art that the teachings disclosed herein can be applied to other systems without departing from the scope and spirit of the application.

What is claimed is:

1. A method for repairing a blade connection of a generator rotor comprising an internally threaded hole formed in the generator rotor and an externally threaded blade root, wherein a generator rotor blade comprises the externally threaded root and an airfoil, the method comprising the steps of:
removing the blade from the generator rotor;
removing material of a first section of the root extending from an end of the root closest to the airfoil;
engaging the threads of a second section of the root furthest away from the airfoil into the threaded hole;
removing a second material from the externally threaded blade root over a height of the first section ($h_1$) which is larger than two times a pitch of the threads, wherein no material is removed from the externally threaded blade root in the second section having a height of the second section ($h_2$) which is larger than three times the pitch of the threads; and
screwing the blade into the threaded hole.

2. The method as claimed in claim 1, further comprising removing material in a first hole sector of the threaded holes closest to a surface of the generator rotor.

3. The method as claimed in claim 1, further comprising machining the first hole sector with an inclination such that the diameter decreases towards the bottom of the threaded hole.

4. The method as claimed in claim 2, further comprising splitting a ring into at least two sections and placed around the first section of the root before the blade is screwed back into the threaded hole.

5. The method as claimed in claim 4, further comprising pressing the ring between the blade and the generator rotor by screwing the blade into threaded hole.

6. The method as claimed in claim 5, further comprising pressing the ring in the direction parallel to the axis of the threaded hole by a platform of the blade and against an inclined side wall of the first hole sector which translates the axial movement of the ring sectors into a movement towards the first section of the root thereby creating a form fit between the generator rotor, the ring and the blade root.

7. The method as claimed in claim 1, further comprising removing material from the generator rotor at the bottom of the threaded hole before the blade is screwed back into the threaded hole to provide a free end below the root, and screwing back the blade into the threaded hole such that the blade comes to a rest on an outer surface of the generator rotor, a countersink machined on the outer surface of the generator rotor or on the ring.

8. A reworked blade comprising an airfoil and a threaded root, wherein the threaded root comprises a first section which is extending from an end of the threaded root closest to the airfoil having a diameter ($d_1$) which is smaller than a minor diameter of a thread in a second section of the root wherein the thread of the second section of the root is further away from the airfoil than the first section, and in that a first plurality of threads of the threaded root engage into a second plurality of threads of a threaded hole in an outer section of the threaded hole extending for a height of at least two times the pitch of the second plurality of threads from a top of the threaded hole towards a bottom of the threaded hole.

9. The reworked blade as claimed in claim 8, wherein the first section is obtained by removing the thread from the root for a height of first section ($h_1$) below the airfoil.

10. A reworked blade generator rotor assembly, comprising:

a blade having an airfoil and a threaded root and a generator rotor with a threaded hole into which the blade is screwed in, wherein the threaded root comprises a first section which is extending from an end of the threaded root closest to the airfoil and which has a diameter ($d_1$) which is smaller than a minor diameter of the threaded hole, and a threaded second section of the root which is further away from the airfoil than the first section, and in that a first plurality of threads of the threaded root engage into a second plurality of threads of the threaded hole in an outer section of the threaded hole extending for a height of at least two times the pitch of the second plurality of threads from a surface of the rotor towards a bottom of the threaded hole.

11. The reworked blade generator rotor assembly as claimed in claim 10, wherein the threaded hole of a first hole sector close to the surface of the generator rotor has a cylindrical shape or a conical shape free of threads, wherein a smallest diameter of the first hole sector ($d_3$) is larger than a major diameter ($d_4$) of the thread, and a ring which is split into at least two sections is placed in a space between the first section of the threaded root and the first hole sector.

12. The reworked blade generator rotor assembly as claimed in claim 10, wherein the ring is made of a first material having a higher coefficient of thermal expansion than a second material of the root.

* * * * *

UNITED STATES PATENT AND TRADEMARK OFFICE
CERTIFICATE OF CORRECTION

| | |
|---|---|
| PATENT NO. | : 10,527,056 B2 |
| APPLICATION NO. | : 15/369074 |
| DATED | : January 7, 2020 |
| INVENTOR(S) | : Michele Pesce and Juergen Gerhard Hoffmann |

It is certified that error appears in the above-identified patent and that said Letters Patent is hereby corrected as shown below:

On the Title Page

Item (73) The Assignee is shown as General Electric Company. It should be changed to General Electric Technology GMBH.

Signed and Sealed this
Twelfth Day of May, 2020

Andrei Iancu
*Director of the United States Patent and Trademark Office*